US012658999B2

(12) United States Patent     (10) Patent No.:   US 12,658,999 B2
Kim et al.     (45) Date of Patent:    Jun. 16, 2026

(54) GIVENS ROTATION MATRIX PARAMETERIZATION PRE-PROCESSING FOR CHANNEL STATE INFORMATION FEEDBACK ENHANCEMENT IN A COMMUNICATION NETWORK

(71) Applicant: NOKIA TECHNOLOGIES OY, Espoo (FI)

(72) Inventors: Jee Hyun Kim, Unterhaching (DE); Wolfgang Zirwas, Munich (DE); Filippo Tosato, Bures sur Yvette (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 315 days.

(21) Appl. No.: 18/366,285

(22) Filed: Aug. 7, 2023

(65) Prior Publication Data

US 2025/0055526 A1    Feb. 13, 2025

(51) Int. Cl.
    *H04B 7/06*       (2006.01)
(52) U.S. Cl.
    CPC ........... *H04B 7/0626* (2013.01); *H04B 7/063* (2013.01)
(58) Field of Classification Search
    CPC ..... H04B 7/0626; H04B 7/063; H04W 28/16; H04W 24/02
    See application file for complete search history.

(56) References Cited

U.S. PATENT DOCUMENTS

| | | | |
|---|---|---|---|
| 11,876,585 B1 * | 1/2024 | Bachu ................... | H04B 7/0456 |
| 2007/0104163 A1 * | 5/2007 | Kim ....................... | H04B 7/043 |
| | | | 370/338 |

| | | | |
|---|---|---|---|
| 2007/0115799 A1 * | 5/2007 | Ting .................... | H04L 25/0248 |
| | | | 370/208 |
| 2008/0108310 A1 * | 5/2008 | Tong .................... | H04W 74/06 |
| | | | 455/69 |
| 2011/0159866 A1 * | 6/2011 | Kim ..................... | H04B 7/0626 |
| | | | 455/422.1 |
| 2016/0007340 A1 * | 1/2016 | Park .................... | H04B 7/0626 |
| | | | 370/329 |
| 2020/0136700 A1 * | 4/2020 | Bogale ................. | H04B 7/0456 |
| 2020/0343961 A1 * | 10/2020 | Miao ................... | H04B 7/0478 |
| 2021/0167833 A1 * | 6/2021 | Wu ...................... | H04B 7/0417 |
| 2021/0297178 A1 * | 9/2021 | Kim ..................... | H04L 5/0055 |
| 2023/0370885 A1 * | 11/2023 | Lee ..................... | H04B 7/0626 |

(Continued)

OTHER PUBLICATIONS

"3rd Generation Partnership Project; Technical Specification Group Radio Access Network; Study on Artificial Intelligence (AI)/ Machine Learning (ML) for NR air interface (Release 18)", 3GPP TR 38.843 v0.1.0, (May 2023), 69 pages.

(Continued)

*Primary Examiner* — Christine Ng

(74) *Attorney, Agent, or Firm* — Alston & Bird LLP

(57)          ABSTRACT

Methods, systems, apparatuses, and computer program products are provided for Givens rotation (GR) matrix parameterization pre-processing for channel state information feedback enhancement in a communication network. In this regard, channel measurement data related to a user equipment is transformed into Givens rotation (GR) matrix parameter data. Additionally, the GR matrix parameter data is encoded using at least one artificial intelligence (AI) model to generate channel state information (CSI) feedback data associated with the channel measurement data.

10 Claims, 11 Drawing Sheets

(56)         References Cited

U.S. PATENT DOCUMENTS

| | | | |
|---|---|---|---|
| 2024/0030989 A1* | 1/2024 | Kim | H04B 7/0626 |
| 2024/0275453 A1* | 8/2024 | Ibrahim | H04B 7/0617 |
| 2024/0275456 A1* | 8/2024 | Chen | H04B 7/0626 |
| 2024/0275566 A1* | 8/2024 | Lin | H04L 5/0053 |
| 2025/0220480 A1* | 7/2025 | Zhang | H04W 24/10 |

OTHER PUBLICATIONS

"L1 Module User Guide; Singular Value Decomposition (Svd)", AMD, Retrieved via the Internet on Sep. 25, 2024; <URL:https://xilinx.github.io/Vitis_Libraries/quantitative_finance/2021.2/guide_L1/SVD/SVD.html/>, (2021), 4 pages.

Golub et al., "Matrix Computations", The Johns Hopkins University Press, (2013), 781 pages.

Intel Corporation, "Explicit CSI reporting for FD-MIMO", 3GPP TSG-RAN WG1 #85, R1-164150, (May 23-27, 2016), 9 pages.

InterDigital, Inc., "Discussion on AI/ML for CSI feedback enhancement", 3GPP TSG RAN WG1 #113, R1-2304780, (May 22-26, 2023), 10 pages.

Ji et al., "CLNet: Complex Input Lightweight Neural Network Designed for Massive MIMO CSI Feedback," IEEE Wireless Communications Letters, vol. 10, No. 10, (Oct. 2021), 5 pages.

Li et al., "CVLNet: A Complex-Valued Lightweight Network for CSI Feedback," IEEE Wireless Communications Letters, vol. 11, No. 5, (May 2022), pp. 1092-1096.

Nokia et al., "CSI Enhancements for MU-MIMO Support", 3GPP TSG RAN WG1 #94-bis, R1-1811406, (Oct. 8-12, 2018), 13 pages.

Qualcomm Incorporated, "Other aspects on AI/ML for CSI feedback enhancement", 3GPP TSG RAN WG1 #113, R1-2305329, (May 22-26, 2023), 30 pages.

Roh et al,. "An efficient feedback method for MIMO systems with slowly time-varying channels", 2004 IEEE Wireless Communications and Networking Conference, vol. 2, (Jul. 19, 2004), 5 pages.

Roh et al., "Efficient feedback methods for MIMO channels based on parameterization", IEEE Transactions on Wireless Communications, 6 (1), (2006), 11 pages.

* cited by examiner

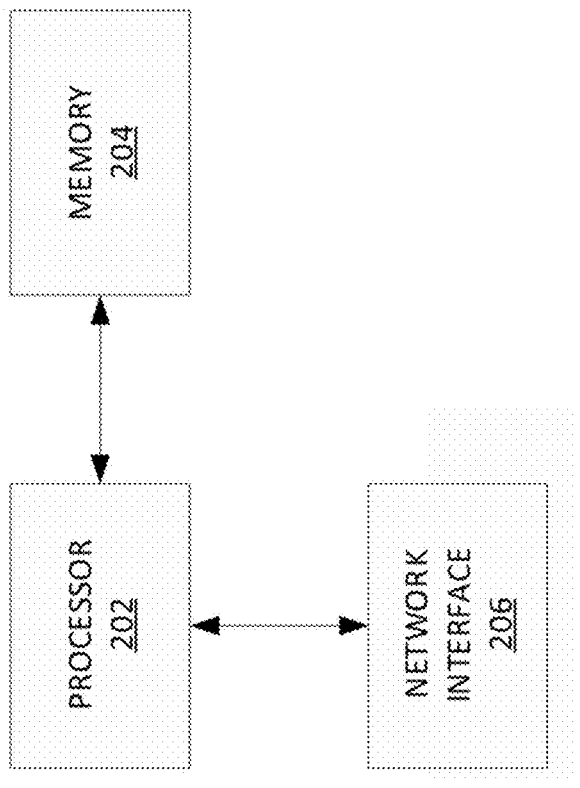
FIG. 2

Figure 10:
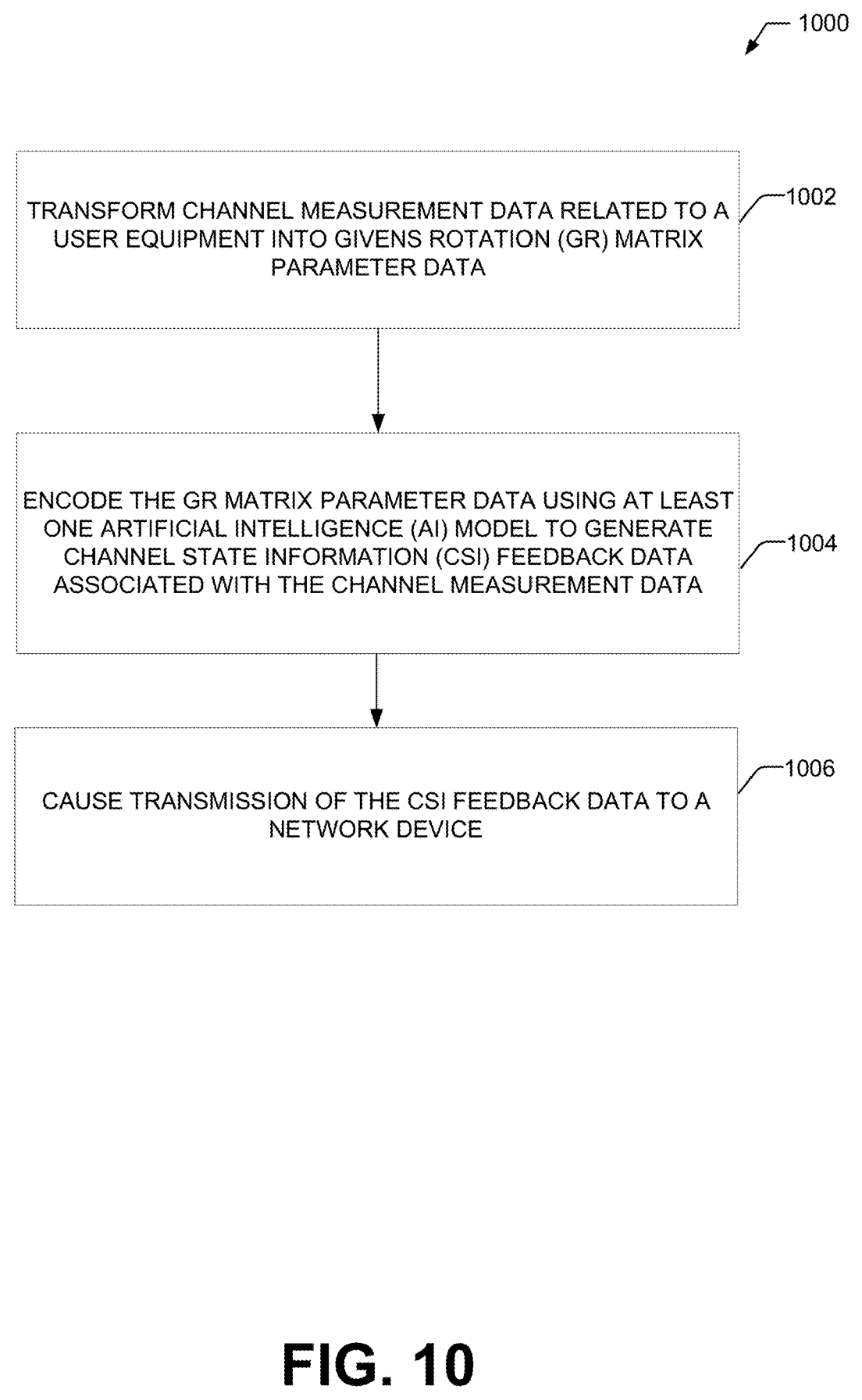

1000

TRANSFORM CHANNEL MEASUREMENT DATA RELATED TO A USER EQUIPMENT INTO GIVENS ROTATION (GR) MATRIX PARAMETER DATA —1002

ENCODE THE GR MATRIX PARAMETER DATA USING AT LEAST ONE ARTIFICIAL INTELLIGENCE (AI) MODEL TO GENERATE CHANNEL STATE INFORMATION (CSI) FEEDBACK DATA ASSOCIATED WITH THE CHANNEL MEASUREMENT DATA —1004

CAUSE TRANSMISSION OF THE CSI FEEDBACK DATA TO A NETWORK DEVICE —1006

Figure 11:
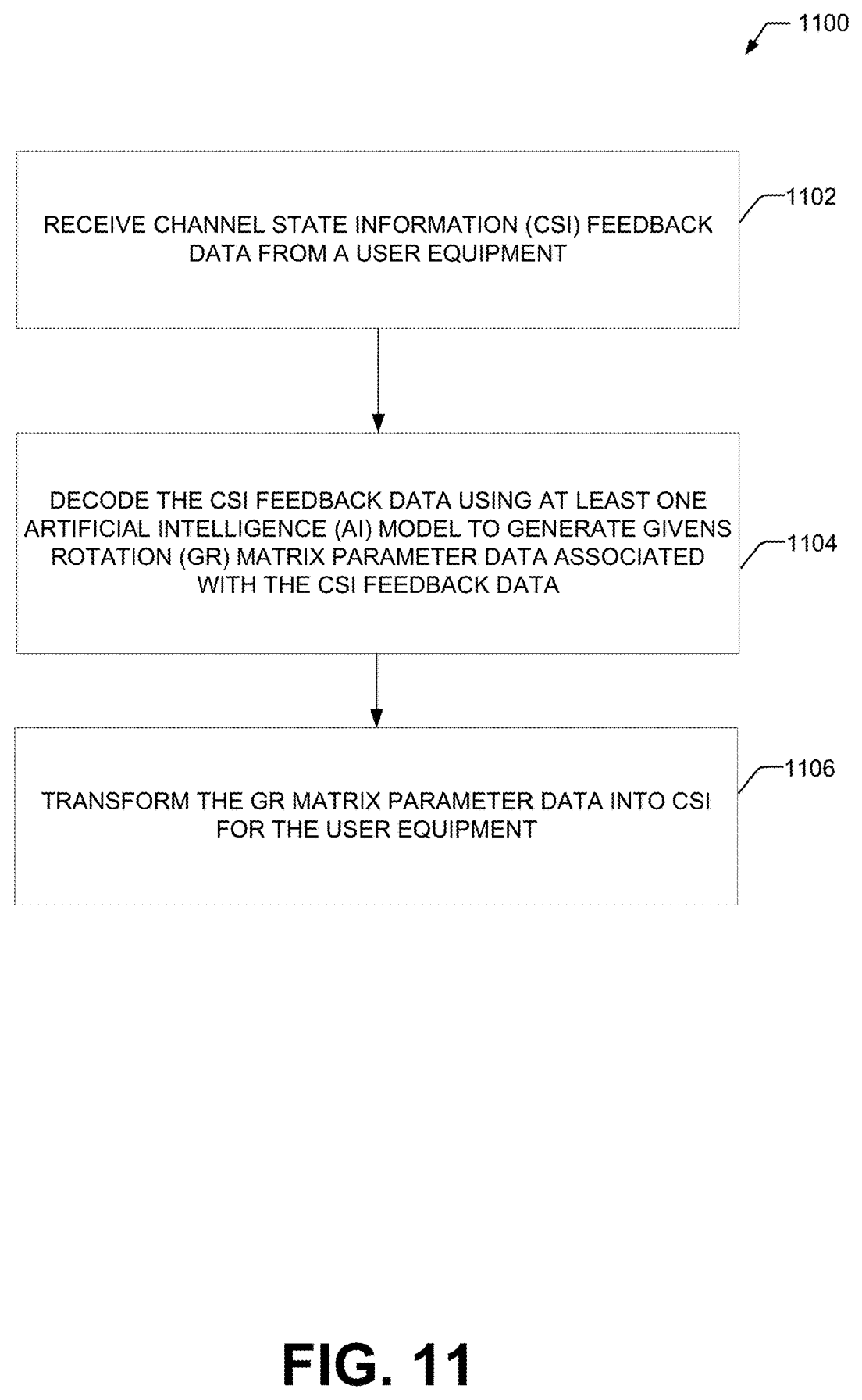

RECEIVE CHANNEL STATE INFORMATION (CSI) FEEDBACK DATA FROM A USER EQUIPMENT

1102

DECODE THE CSI FEEDBACK DATA USING AT LEAST ONE ARTIFICIAL INTELLIGENCE (AI) MODEL TO GENERATE GIVENS ROTATION (GR) MATRIX PARAMETER DATA ASSOCIATED WITH THE CSI FEEDBACK DATA

1104

TRANSFORM THE GR MATRIX PARAMETER DATA INTO CSI FOR THE USER EQUIPMENT

GIVENS ROTATION MATRIX PARAMETERIZATION PRE-PROCESSING FOR CHANNEL STATE INFORMATION FEEDBACK ENHANCEMENT IN A COMMUNICATION NETWORK

TECHNOLOGICAL FIELD

An example embodiment of the present disclosure generally relates to communication systems and, more particularly, to machine learning architectures and/or procedures for a communication network.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, with a communication network and one or more compatible communication devices. Communication systems continue to evolve to extend the flexibility in the network usage, to provide improved security, and/or to provide users with improved network services. For instance, fourth generation (4G) wireless mobile telecommunications technology, also known as Long Term Evolution (LTE) technology, was designed to provide high-capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) has developed standards for 5G technology, including standards for next generation radio access networks and 5G network architectures that can deliver extreme broadband and ultra-robust, low latency connectivity. 5G technology improves a variety of telecommunication services offered to the end users and helps to support broadband that delivers gigabytes of bandwidth per second on demand for both the uplink and downlink transmissions. Additionally, the 5G network has been designed to enable network automation, data collection, and/or data transmission for network functions using artificial intelligence (AI) and/or machine learning (ML). For example, a paired AI/ML model can be utilized between a user equipment and a network. However, data related to AI/ML modeling and/or data communications between a user equipment and a network can often be inefficiently configured and/or transmitted via a network.

BRIEF SUMMARY

Methods, apparatuses and computer program products are provided in accordance with example embodiments to provide Givens rotation (GR) matrix parameterization pre-processing for channel state information feedback enhancement in a communication network.

In an example embodiment, a method is provided that includes transforming channel measurement data related to a user equipment into Givens rotation (GR) matrix parameter data. In one or more embodiments, the method additionally or alternatively includes encoding the GR matrix parameter data using at least one artificial intelligence (AI) model to generate channel state information (CSI) feedback data associated with the channel measurement data. In one or more embodiments, the method additionally or alternatively includes causing transmission of the CSI feedback data to a network device.

In one or more embodiments, the method additionally or alternatively includes encoding the GR matrix parameter data using the at least one AI model to generate codeword data associated with the channel measurement data. In one or more embodiments, the method additionally or alternatively includes quantizing the codeword data to generate the CSI feedback data.

In one or more embodiments, the GR matrix parameter data is associated with respective channel eigenvectors for the channel measurement data.

In one or more embodiments, the GR matrix parameter data is associated with channel eigenvector matrix data for the channel measurement data.

In one or more embodiments, the GR matrix parameter data includes phase data associated with the channel measurement data.

In one or more embodiments, the GR matrix parameter data includes rotational angle data associated with the channel measurement data.

In one or more embodiments, encoding the GR matrix parameter data includes encoding respective channel layers associated with the GR matrix parameter data to generate at least a portion of the CSI feedback data.

In one or more embodiments, encoding the GR matrix parameter data includes encoding the GR matrix parameter data using an AI model configured for phase compression to generate at least a portion of the CSI feedback data.

In one or more embodiments, encoding the GR matrix parameter data includes encoding the GR matrix parameter data using an AI model configured for rotational angle compression to generate at least a portion of the CSI feedback data.

In one or more embodiments, the method additionally or alternatively includes causing transmission of a pairing identifier to the network device. In one or more embodiments, the pairing identifier indicates a type of matrix parameterization processing scheme associated with the GR matrix parameter data.

In one or more embodiments, the method additionally or alternatively includes encoding at least a portion of the GR matrix parameter data without utilization of the at least one AI model to generate encoded GR matrix parameter data. In one or more embodiments, the method additionally or alternatively includes causing transmission of the encoded GR matrix parameter data via ground-truth CSI reporting.

In another example embodiment, an apparatus is provided that includes at least one processor and at least one memory storing instructions, that, when executed by the at least one processor, cause the apparatus to transform channel measurement data related to a user equipment into GR matrix parameter data. In one or more embodiments, the apparatus additionally or alternatively includes instructions that, when executed by the at least one processor, cause the apparatus to encode the GR matrix parameter data using at least one AI model to generate CSI feedback data associated with the channel measurement data. In one or more embodiments, the apparatus additionally or alternatively includes instructions that, when executed by the at least one processor, cause the apparatus to cause transmission of the CSI feedback data to a network device.

In one or more embodiments, the apparatus additionally or alternatively includes instructions that, when executed by the at least one processor, cause the apparatus to encode the GR matrix parameter data using the at least one AI model to generate codeword data associated with the channel measurement data. In one or more embodiments, the apparatus additionally or alternatively includes instructions that, when executed by the at least one processor, cause the apparatus to quantize the codeword data to generate the CSI feedback data.

In one or more embodiments, the GR matrix parameter data is associated with respective channel eigenvectors for the channel measurement data.

In one or more embodiments, the GR matrix parameter data is associated with channel eigenvector matrix data for the channel measurement data.

In one or more embodiments, the GR matrix parameter data includes phase data associated with the channel measurement data.

In one or more embodiments, the GR matrix parameter data includes rotational angle data associated with the channel measurement data.

In one or more embodiments, the apparatus additionally or alternatively includes instructions that, when executed by the at least one processor, cause the apparatus to encode respective channel layers associated with the GR matrix parameter data to generate at least a portion of the CSI feedback data.

In one or more embodiments, the apparatus additionally or alternatively includes instructions that, when executed by the at least one processor, cause the apparatus to encode the GR matrix parameter data using an AI model configured for phase compression to generate at least a portion of the CSI feedback data.

In one or more embodiments, the apparatus additionally or alternatively includes instructions that, when executed by the at least one processor, cause the apparatus to encode the GR matrix parameter data using an AI model configured for rotational angle compression to generate at least a portion of the CSI feedback data.

In one or more embodiments, the apparatus additionally or alternatively includes instructions that, when executed by the at least one processor, cause the apparatus to cause transmission of a pairing identifier to the network device. In one or more embodiments, the pairing identifier indicates a type of matrix parameterization processing scheme associated with the GR matrix parameter data.

In one or more embodiments, the apparatus additionally or alternatively includes instructions that, when executed by the at least one processor, cause the apparatus to encode at least a portion of the GR matrix parameter data without utilization of the at least one AI model to generate encoded GR matrix parameter data. In one or more embodiments, the apparatus additionally or alternatively includes instructions that, when executed by the at least one processor, cause the apparatus to cause transmission of the encoded GR matrix parameter data via ground-truth CSI reporting.

In yet another example embodiment, an apparatus is provided. The apparatus provides means for transforming channel measurement data related to a user equipment into GR matrix parameter data. In one or more embodiments, the apparatus additionally or alternatively provides means for encoding the GR matrix parameter data using at least one AI model to generate CSI feedback data associated with the channel measurement data. In one or more embodiments, the apparatus additionally or alternatively provides means for causing transmission of the CSI feedback data to a network device.

In one or more embodiments, the apparatus additionally or alternatively provides means for encoding the GR matrix parameter data using the at least one AI model to generate codeword data associated with the channel measurement data. In one or more embodiments, the apparatus additionally or alternatively provides means for quantizing the codeword data to generate the CSI feedback data.

In one or more embodiments, the GR matrix parameter data is associated with respective channel eigenvectors for the channel measurement data.

In one or more embodiments, the GR matrix parameter data is associated with channel eigenvector matrix data for the channel measurement data.

In one or more embodiments, the GR matrix parameter data includes phase data associated with the channel measurement data.

In one or more embodiments, the GR matrix parameter data includes rotational angle data associated with the channel measurement data.

In one or more embodiments, means for encoding the GR matrix parameter data additionally or alternatively includes means for encoding respective channel layers associated with the GR matrix parameter data to generate at least a portion of the CSI feedback data.

In one or more embodiments, means for encoding the GR matrix parameter data additionally or alternatively includes means for encoding the GR matrix parameter data using an AI model configured for phase compression to generate at least a portion of the CSI feedback data.

In one or more embodiments, means for encoding the GR matrix parameter data additionally or alternatively includes means for encoding the GR matrix parameter data using an AI model configured for rotational angle compression to generate at least a portion of the CSI feedback data.

In one or more embodiments, the apparatus additionally or alternatively provides means for causing transmission of a pairing identifier to the network device. In one or more embodiments, the pairing identifier indicates a type of matrix parameterization processing scheme associated with the GR matrix parameter data.

In one or more embodiments, the apparatus additionally or alternatively provides means for encoding at least a portion of the GR matrix parameter data without utilization of the at least one AI model to generate encoded GR matrix parameter data. In one or more embodiments, the apparatus additionally or alternatively provides means for causing transmission of the encoded GR matrix parameter data via ground-truth CSI reporting.

In yet another example embodiment, a non-transitory computer-readable storage medium is provided. In one or more embodiments, the non-transitory computer-readable storage medium includes program instructions stored thereon that are configured to transform channel measurement data related to a user equipment into GR matrix parameter data. In one or more embodiments, the non-transitory computer-readable storage medium additionally or alternatively includes program instructions stored thereon that are configured to encode the GR matrix parameter data using at least one AI model to generate CSI feedback data associated with the channel measurement data. In one or more embodiments, the non-transitory computer-readable storage medium additionally or alternatively includes program instructions stored thereon that are configured to cause transmission of the CSI feedback data to a network device.

In one or more embodiments, the non-transitory computer-readable storage medium additionally or alternatively includes program instructions stored thereon that are configured to encode the GR matrix parameter data using the at least one AI model to generate codeword data associated with the channel measurement data. In one or more embodiments, the non-transitory computer-readable storage medium additionally or alternatively includes program instructions stored thereon that are configured to quantize the codeword data to generate the CSI feedback data.

In one or more embodiments, the GR matrix parameter data is associated with respective channel eigenvectors for the channel measurement data.

In one or more embodiments, the GR matrix parameter data is associated with channel eigenvector matrix data for the channel measurement data.

In one or more embodiments, the GR matrix parameter data includes phase data associated with the channel measurement data.

In one or more embodiments, the GR matrix parameter data includes rotational angle data associated with the channel measurement data.

In one or more embodiments, the non-transitory computer-readable storage medium additionally or alternatively includes program instructions stored thereon that are configured to encode respective channel layers associated with the GR matrix parameter data to generate at least a portion of the CSI feedback data.

In one or more embodiments, the non-transitory computer-readable storage medium additionally or alternatively includes program instructions stored thereon that are configured to encode the GR matrix parameter data using an AI model configured for phase compression to generate at least a portion of the CSI feedback data.

In one or more embodiments, the non-transitory computer-readable storage medium additionally or alternatively includes program instructions stored thereon that are configured to encode the GR matrix parameter data using an AI model configured for rotational angle compression to generate at least a portion of the CSI feedback data.

In one or more embodiments, the non-transitory computer-readable storage medium additionally or alternatively includes program instructions stored thereon that are configured to cause transmission of a pairing identifier to the network device. In one or more embodiments, the pairing identifier indicates a type of matrix parameterization processing scheme associated with the GR matrix parameter data.

In one or more embodiments, the non-transitory computer-readable storage medium additionally or alternatively includes program instructions stored thereon that are configured to encode at least a portion of the GR matrix parameter data without utilization of the at least one AI model to generate encoded GR matrix parameter data. In one or more embodiments, the non-transitory computer-readable storage medium additionally or alternatively includes program instructions stored thereon that are configured to cause transmission of the encoded GR matrix parameter data via ground-truth CSI reporting.

In another example embodiment, a method is provided that includes receiving CSI feedback data from a user equipment. In one or more embodiments, the method additionally or alternatively includes decoding the CSI feedback data using at least one AI model to generate GR matrix parameter data associated with the CSI feedback data. In one or more embodiments, the method additionally or alternatively includes transforming the GR matrix parameter data into CSI for the user equipment.

In one or more embodiments, the method additionally or alternatively includes dequantizing the CSI feedback data to determine codeword data. In one or more embodiments, the method additionally or alternatively includes decoding the codeword data using the at least one AI model to generate the GR matrix parameter data.

In one or more embodiments, the method additionally or alternatively includes receiving a pairing identifier from the user equipment. In one or more embodiments, the pairing identifier indicates a type of matrix parameterization processing scheme associated with the CSI feedback data. In one or more embodiments, the method additionally or alternatively includes transforming the GR matrix parameter data into the CSI based on the pairing identifier.

In one or more embodiments, decoding the CSI feedback data includes determining phase data associated with the CSI feedback data.

In one or more embodiments, decoding the CSI feedback data includes determining rotational angle data associated with the CSI feedback data.

In one or more embodiments, the method additionally or alternatively includes determining CSI reporting data associated with the CSI feedback data without utilization of the at least one AI model.

In another example embodiment, an apparatus is provided that includes at least one processor and at least one memory storing instructions, that, when executed by the at least one processor, cause the apparatus to receive CSI feedback data from a user equipment. In one or more embodiments, the apparatus additionally or alternatively includes instructions that, when executed by the at least one processor, cause the apparatus to decode the CSI feedback data using at least one AI model to generate GR matrix parameter data associated with the CSI feedback data. In one or more embodiments, the apparatus additionally or alternatively includes instructions that, when executed by the at least one processor, cause the apparatus to transform the GR matrix parameter data into CSI for the user equipment.

In one or more embodiments, the apparatus additionally or alternatively includes instructions that, when executed by the at least one processor, cause the apparatus to dequantize the CSI feedback data to determine codeword data. In one or more embodiments, the apparatus additionally or alternatively includes instructions that, when executed by the at least one processor, cause the apparatus to decode the codeword data using the at least one AI model to generate the GR matrix parameter data.

In one or more embodiments, the apparatus additionally or alternatively includes instructions that, when executed by the at least one processor, cause the apparatus to receive a pairing identifier from the user equipment. In one or more embodiments, the pairing identifier indicates a type of matrix parameterization processing scheme associated with the CSI feedback data. In one or more embodiments, the apparatus additionally or alternatively includes instructions that, when executed by the at least one processor, cause the apparatus to transform the GR matrix parameter data into the CSI based on the pairing identifier.

In one or more embodiments, the apparatus additionally or alternatively includes instructions that, when executed by the at least one processor, cause the apparatus to determine phase data associated with the CSI feedback data.

In one or more embodiments, the apparatus additionally or alternatively includes instructions that, when executed by the at least one processor, cause the apparatus to determine rotational angle data associated with the CSI feedback data.

In one or more embodiments, the apparatus additionally or alternatively includes instructions that, when executed by the at least one processor, cause the apparatus to determine CSI reporting data associated with the CSI feedback data without utilization of the at least one AI model.

In yet another example embodiment, an apparatus is provided. The apparatus provides means for receiving CSI feedback data from a user equipment. In one or more embodiments, the apparatus additionally or alternatively provides means for decoding the CSI feedback data using at least one AI model to generate GR matrix parameter data associated with the CSI feedback data. In one or more embodiments, the apparatus additionally or alternatively provides means for transforming the GR matrix parameter data into CSI for the user equipment.

In one or more embodiments, the apparatus additionally or alternatively provides means for dequantizing the CSI feedback data to determine codeword data. In one or more embodiments, the apparatus additionally or alternatively provides means for decoding the codeword data using the at least one AI model to generate the GR matrix parameter data.

In one or more embodiments, the apparatus additionally or alternatively provides means for receiving a pairing identifier from the user equipment. In one or more embodiments, the pairing identifier indicates a type of matrix parameterization processing scheme associated with the CSI feedback data. In one or more embodiments, the apparatus additionally or alternatively provides means for transforming the GR matrix parameter data into the CSI based on the pairing identifier.

In one or more embodiments, means for decoding the CSI feedback data additionally or alternatively includes means for determining phase data associated with the CSI feedback data.

In one or more embodiments, decoding the CSI feedback data additionally or alternatively includes means for determining rotational angle data associated with the CSI feedback data.

In one or more embodiments, the apparatus additionally or alternatively provides means for determining CSI reporting data associated with the CSI feedback data without utilization of the at least one AI model.

In yet another example embodiment, a non-transitory computer-readable storage medium is provided. In one or more embodiments, the non-transitory computer-readable storage medium includes program instructions stored thereon that are configured to receive CSI feedback data from a user equipment. In one or more embodiments, the non-transitory computer-readable storage medium additionally or alternatively includes program instructions stored thereon that are configured to decode the CSI feedback data using at least one AI model to generate GR matrix parameter data associated with the CSI feedback data. In one or more embodiments, the non-transitory computer-readable storage medium additionally or alternatively includes program instructions stored thereon that are configured to transform the GR matrix parameter data into CSI for the user equipment.

In one or more embodiments, the non-transitory computer-readable storage medium additionally or alternatively includes program instructions stored thereon that are configured to dequantize the CSI feedback data to determine codeword data. In one or more embodiments, the non-transitory computer-readable storage medium additionally or alternatively includes program instructions stored thereon that are configured to decode the codeword data using the at least one AI model to generate the GR matrix parameter data.

In one or more embodiments, the non-transitory computer-readable storage medium additionally or alternatively includes program instructions stored thereon that are configured to receive a pairing identifier from the user equipment. In one or more embodiments, the pairing identifier indicates a type of matrix parameterization processing scheme associated with the CSI feedback data. In one or more embodiments, the non-transitory computer-readable storage medium additionally or alternatively includes program instructions stored thereon that are configured to transform the GR matrix parameter data into the CSI based on the pairing identifier.

In one or more embodiments, the non-transitory computer-readable storage medium additionally or alternatively includes program instructions stored thereon that are configured to determine phase data associated with the CSI feedback data.

In one or more embodiments, the non-transitory computer-readable storage medium additionally or alternatively includes program instructions stored thereon that are configured to determine rotational angle data associated with the CSI feedback data.

In one or more embodiments, the non-transitory computer-readable storage medium additionally or alternatively includes program instructions stored thereon that are configured to determine CSI reporting data associated with the CSI feedback data without utilization of the at least one AI model.

BRIEF DESCRIPTION OF THE DRAWINGS

Figure 1:
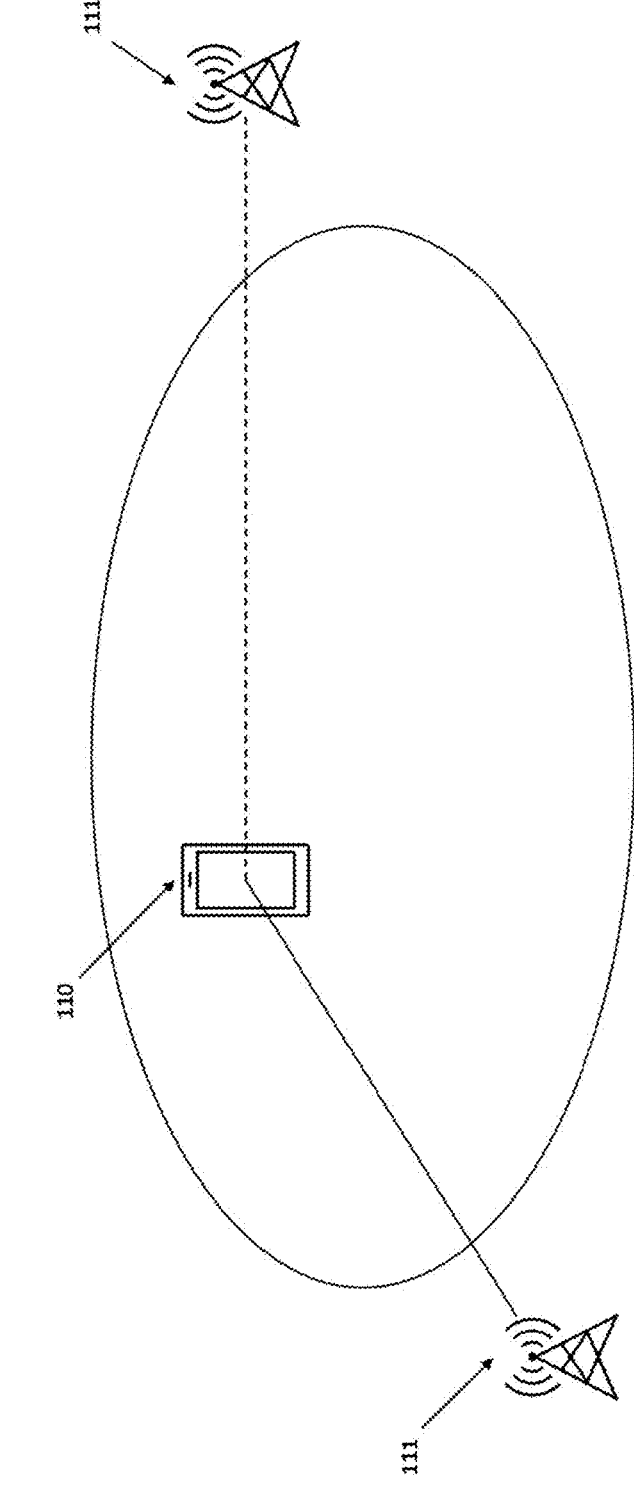
Figure 3:
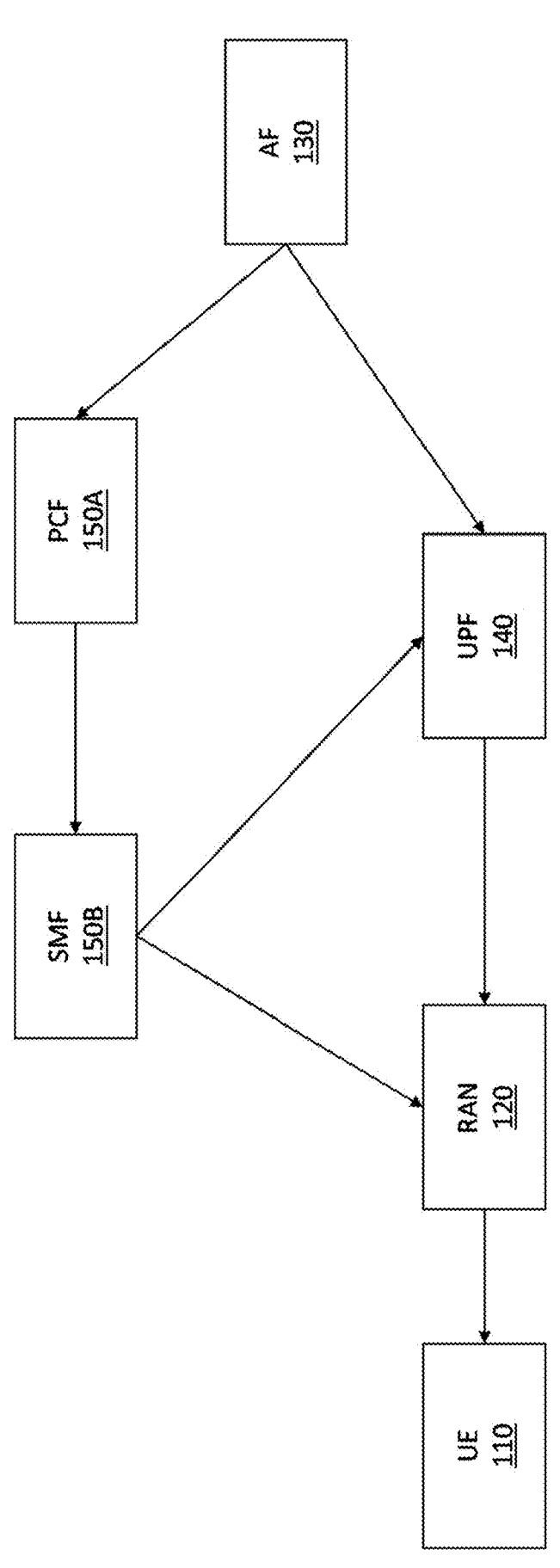
Figure 4:
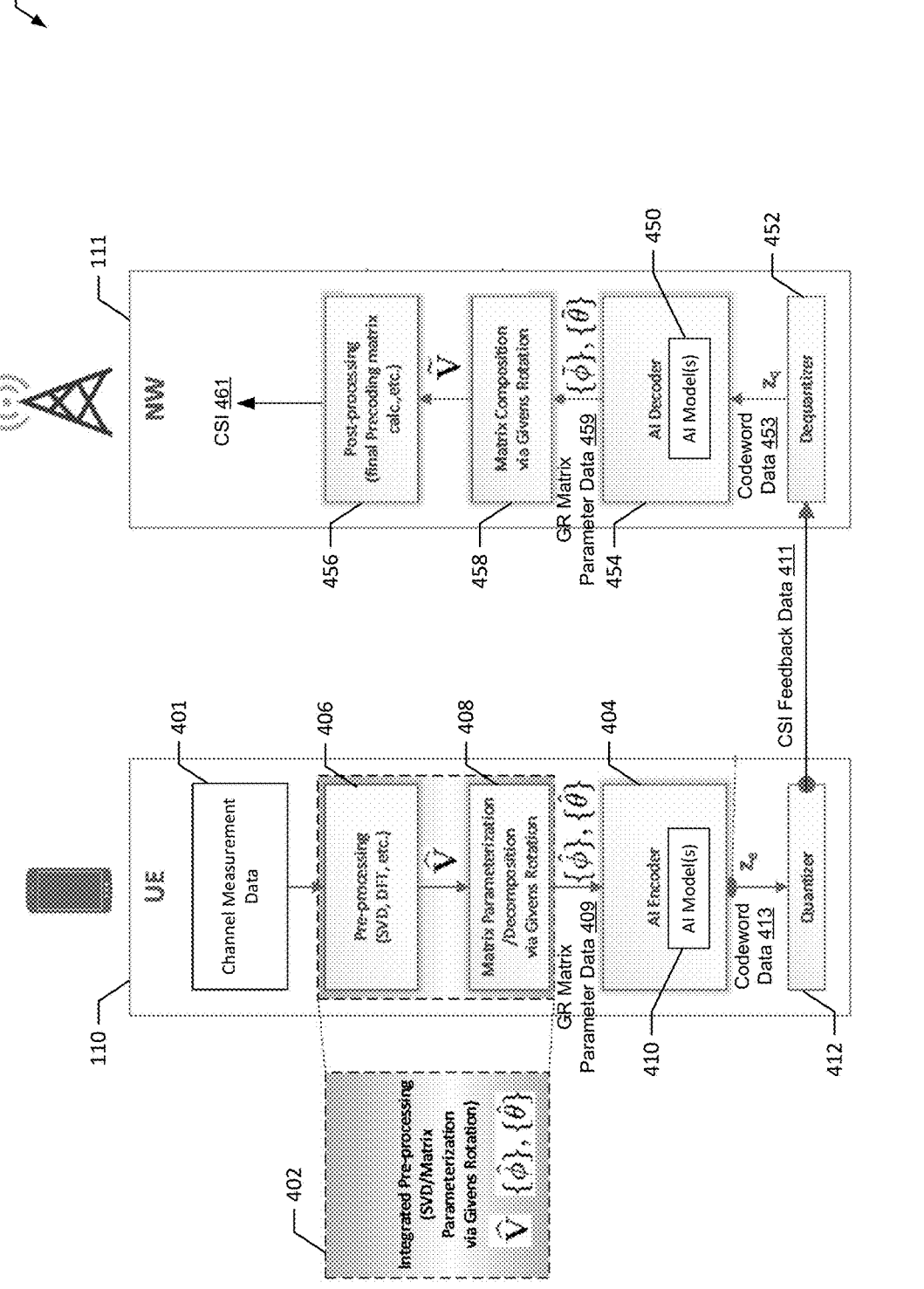
Figure 5:
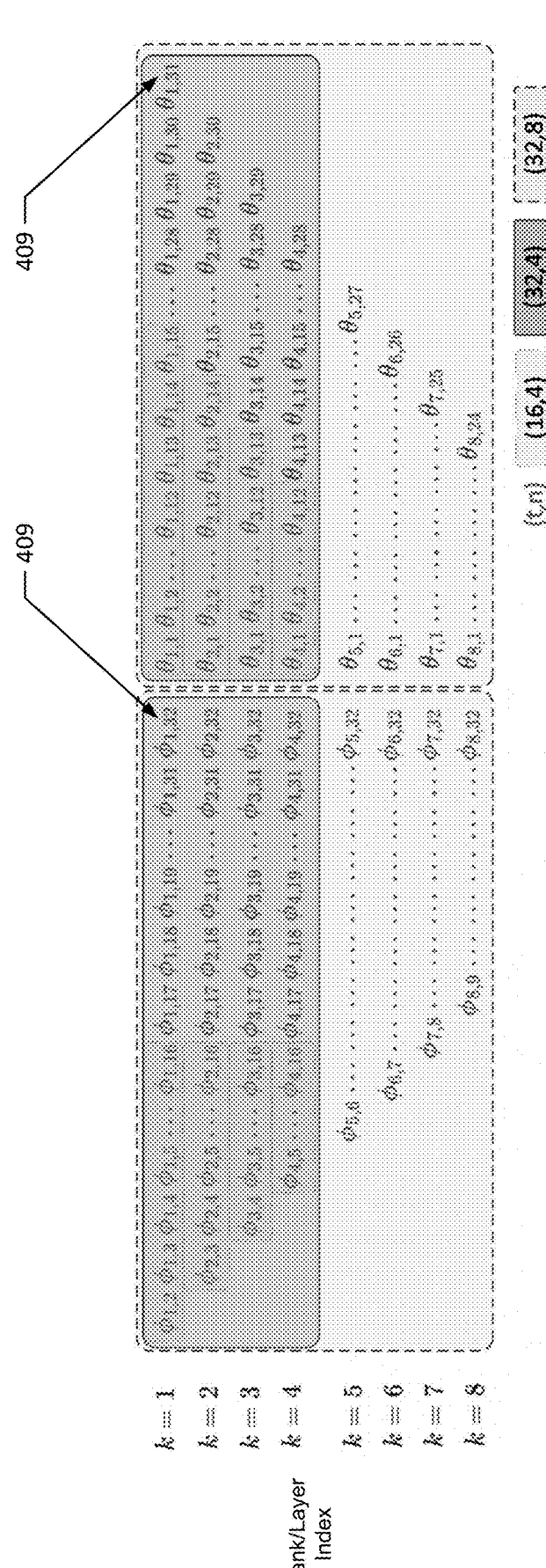
Figure 6:
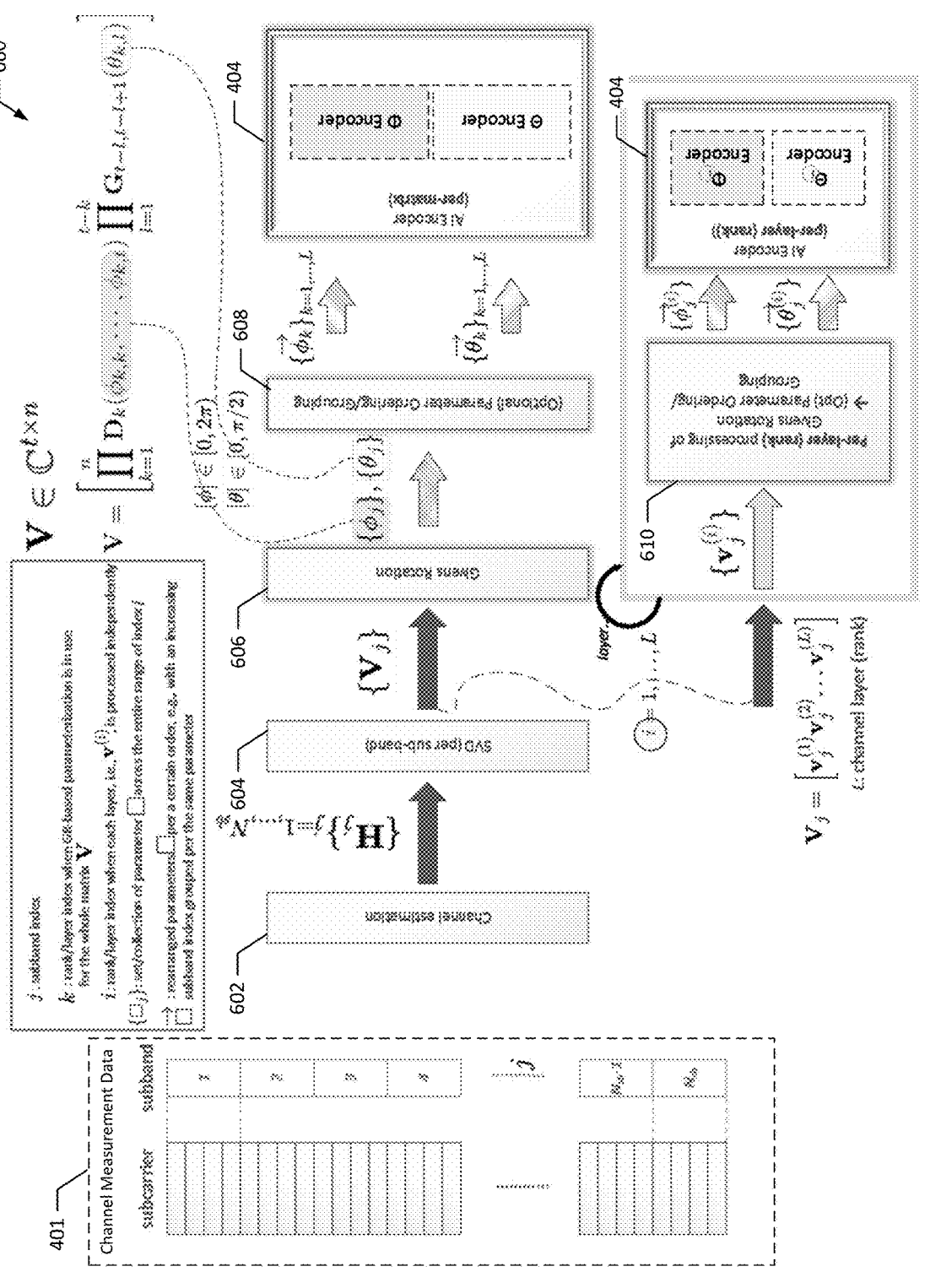
Figure 7:
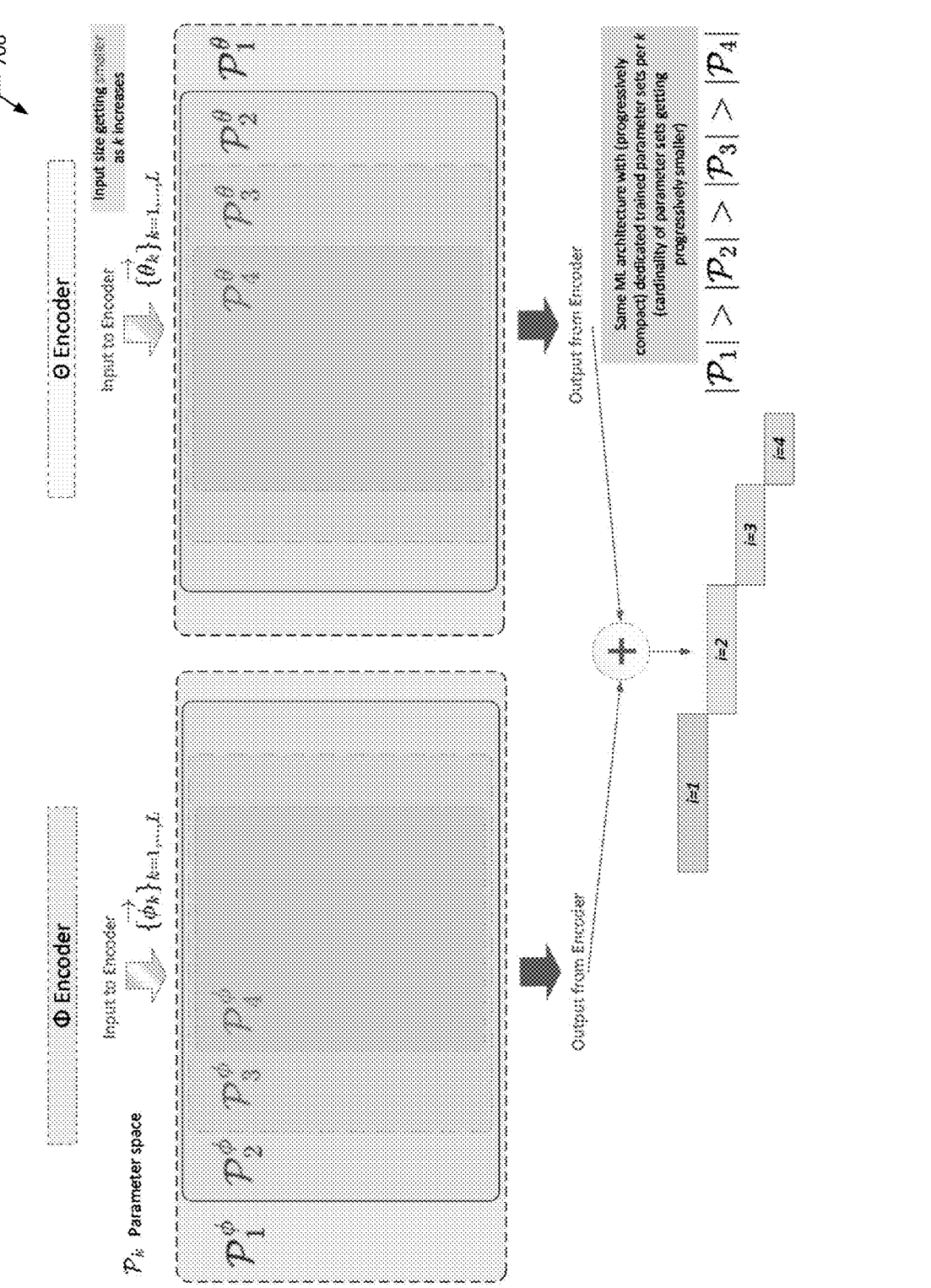
Figure 8:
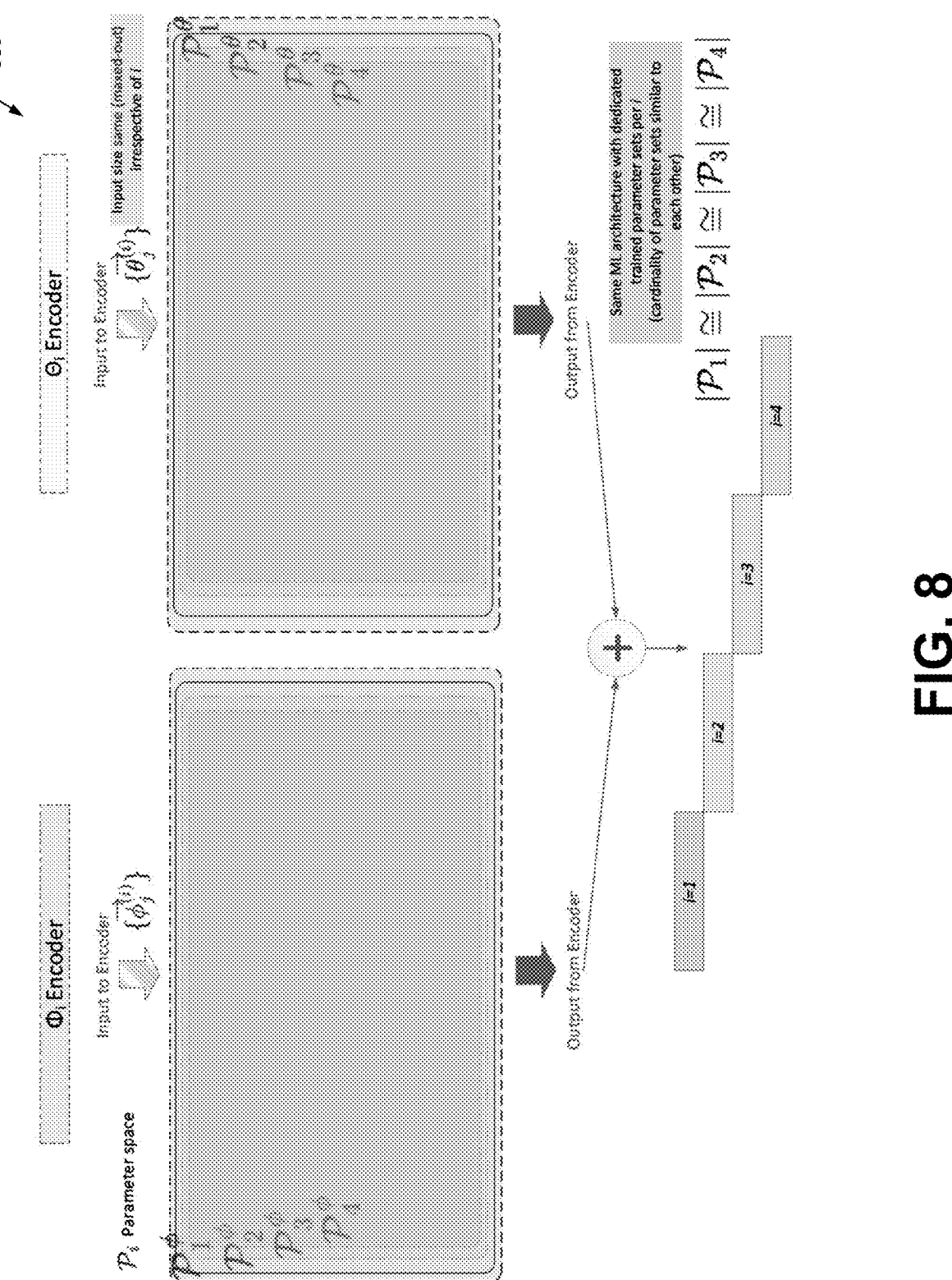
Figure 9:
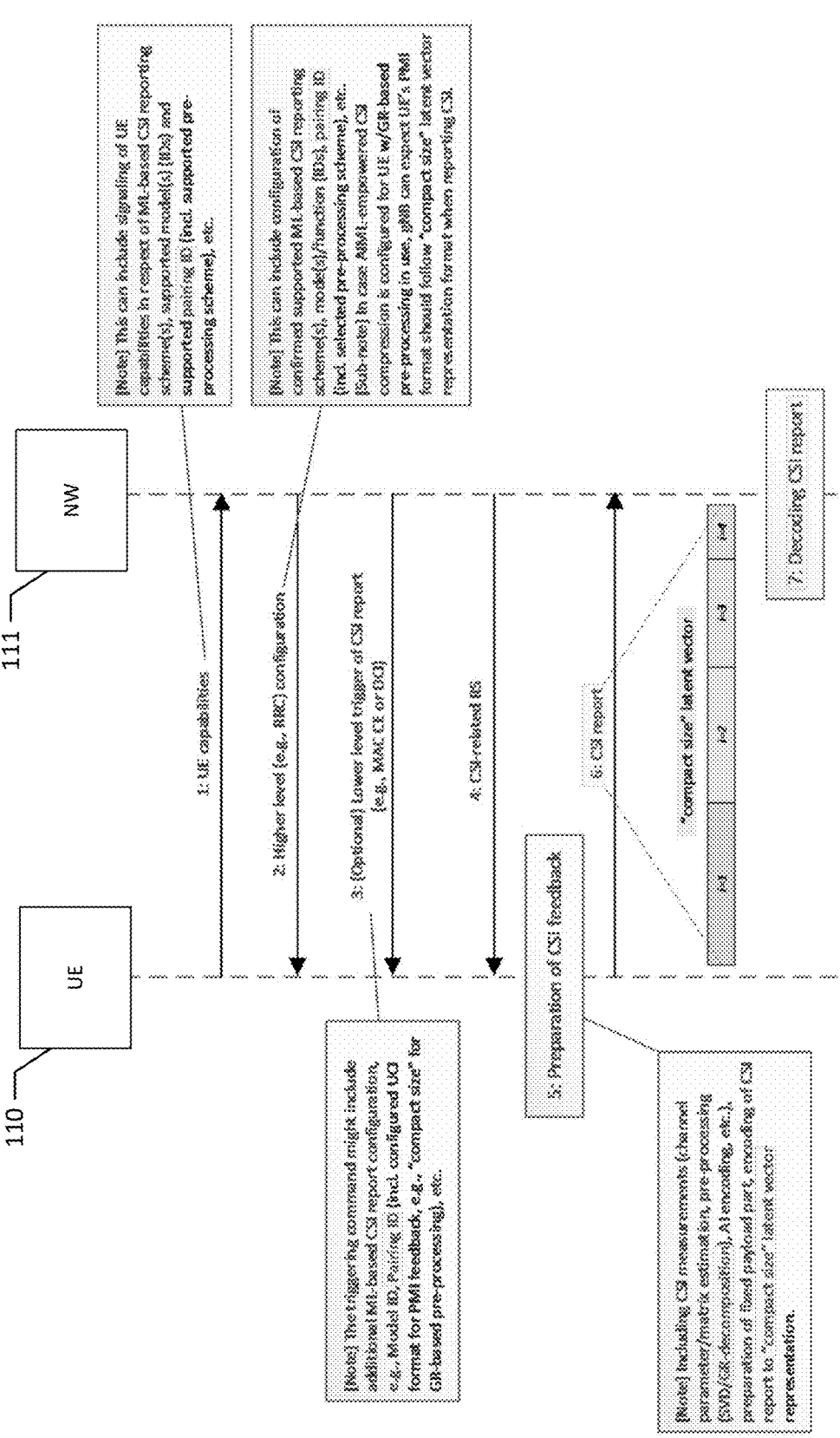

Having thus described certain example embodiments of the invention in general terms, reference will now be made to the accompanying drawings, which are not necessarily drawn to scale, and wherein:

FIG. 1 depicts an example architecture for a communication network in accordance with one or more example embodiments of the present disclosure;

FIG. 2 is a block diagram of an apparatus configured in accordance with one or more example embodiments of the present disclosure;

FIG. 3 depicts another example architecture for a communication network in accordance with one or more example embodiments of the present disclosure;

FIG. 4 depicts another example architecture for a communication network in accordance with one or more example embodiments of the present disclosure;

FIG. 5 depicts example Givens rotation (GR) matrix parameter data in accordance with one or more example embodiments of the present disclosure;

FIG. 6 depicts example GR-based parameter encoding in accordance with one or more example embodiments of the present disclosure;

FIG. 7 depicts an example artificial intelligence (AI) encoder in accordance with one or more example embodiments of the present disclosure;

FIG. 8 depicts another example AI encoder in accordance with one or more example embodiments of the present disclosure;

FIG. 9 illustrates example transmissions between user equipment and at least one network component in accordance with one or more example embodiments of the present disclosure; and FIG. 10 illustrates a flowchart illustrating other operations performed, such as by the apparatus of FIG. 2, in order to provide for GR matrix parameterization pre-processing for channel state information feedback enhancement in a communication network, in accordance with one or more example embodiments of the present disclosure; and FIG. 11 illustrates another flowchart illustrating other operations performed, such as by the apparatus of FIG. 2, in order to provide for GR matrix parameterization pre-processing for channel state information feedback enhancement in a communication network, in accordance with one or more example embodiments of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions. Additionally, next generation systems which utilize the 5G architecture have been designed as a Service Based Architecture (SBA), e.g., a system architecture in which the system functionality is achieved by a set of Network Functions (NFs) providing services to other authorized NFs to access their services. The 5G network allows for the support of NFs via a Network Repository Function (NRF). For example, an NRF can maintain a list of available NFs to facilitate service registration and/or discovery in an instance in which a user equipment (UE) attempts to access one or more services provided by one or more network devices.

Certain embodiments will be illustrated herein in conjunction with example communication systems, frameworks, and/or associated techniques to provide Givens rotation (GR) matrix parameterization pre-processing for channel state information feedback enhancement in a communication network. It should be understood, however, that the scope of the claims is not limited to particular types of communication systems and/or processes disclosed. An example embodiment can be implemented in a terminal device (e.g., a user equipment) or a network (e.g., a communication network) of a communication system, using alternative processes and operations. For example, although illustrated in the context of wireless cellular systems utilizing 3GPP system elements such as a 3GPP next generation core network, the disclosed embodiments can be adapted in a straightforward manner to a variety of other types of communication systems. Additionally, while the present disclosure may describe certain embodiments in conjunction with a 5G communication system, other embodiments also apply to and comprise other networks and network technologies, such as 3G, 4G, Long Term Evolution (LTE), 6G, etc. without limitation.

An example embodiment further contemplates that the methods, apparatuses, and computer program products described herein can also be applicable for use with a variety of network standards and communication protocols including those that have been developed and those which have yet to be developed. In accordance with illustrative embodiments implemented in a 5G communication system environment, one or more 3GPP standards, specifications, and/or protocols provide further explanation of user equipment and core network elements/entities/functions and/or operations performed by the user equipment and the core network elements/entities/functions, e.g., the 3GPP RAN1. Other 3GPP standards, specifications and/or protocols provide other conventional details that one of ordinary skill in the art will realize. However, while illustrative embodiments are well-suited for implementation associated with the above-mentioned 3GPP standards, alternative embodiments are not necessarily intended to be limited to any particular standards.

In a communication system at least a part of a communication session between at least two stations occurs over a wireless link. Examples of wireless systems comprise public land mobile networks (PLMN), satellite-based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or a user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

To facilitate a communication session, network automation, data collection, and/or data transmission can be enabled for network functions using artificial intelligence (AI) and/or machine learning (ML). For example, a paired AI/ML model can be utilized between a user equipment and a network. However, data related to AI/ML modeling and/or data communications between a user equipment and a network can often be inefficiently configured and/or transmitted via a network.

As such, described herein are methods, apparatuses, and computer program products for providing GR matrix parameterization pre-processing for channel state information feedback enhancement in a communication network to resolve some or all of the described limitations of current communication networks and/or current network protocols. In various embodiments, GR parameterization-based pre-processing is provided on a channel eigenvector matrix as a whole or on individual channel eigenvectors at the UE. In various embodiments, a matching counter-part block (e.g., matrix composition via GR) can be further provided for on reconstructed GR parameters at the network.

In various embodiments, the GR matrix parameterization is utilized as pre-processing for one or more AL/ML architectures of the UE. In various embodiments, channel measurement data related to a UE can be transformed into GR matrix parameter data. Additionally, the GR matrix parameter data can be encoded using at least one AI model and/or at least one ML model to generate channel state information (CSI) feedback data associated with the channel measurement data. In various embodiments, a single AI/ML model or respective AI/ML models can be utilized for phase compression and rotation angle compression. In various embodiments, channel eigenvectors (e.g., column vectors of a channel eigenvector matrix configured as a precoding matrix in a spatial-frequency domain) can be provided as input to an AI encoder of a UE. The channel eigenvectors can be collected over collected over sub-bands. Additionally, real and imaginary parts can be decomposed to facilitate determination of the channel eigenvectors. In various embodiments, AI encoder parameters can be trained per layer (e.g., layer-specific parameter sets) or layer-common (e.g., common parameters irrespective of a layer index). In various embodiments, the AI encoder can process one channel eigenvector or a stacked version of channel eigenvectors (over sub-bands). In various embodiments, output of the AI encoder (e.g., a quantized outcome) can be provided on a per-layer basis, with each layer-associated CSI feedback being configured with a same length (e.g., with the same quantization resolution per layer). In various embodiments, the GR-based parameterization scheme can be additionally or alternatively utilized for ground-truth CSI reporting. For example, extracted GR parameters can be subsequently encoded via a non-AI-based scheme (and/or a non-ML-based scheme) to reduce overhead for reporting.

Accordingly, improved performance of AI encoding of channel measurements via user equipment can be provided. Additionally or alternatively, improved performance of AI decoding related to channel measurements via a network can be provided. In various embodiments, sizing of an AI encoder and/or an AI decoder can be optimized to reduce a number of computing resources associated with encoding and/or decoding. In various embodiments, orthogonality of channel eigenvectors and/or physical properties of input CSI can additionally be maintained while also optimizing the encoding and/or decoding processes. CSI feedback signaling between a user equipment and a network can also be reduced.

By providing GR matrix parameterization pre-processing for channel state information feedback enhancement, it is also possible to improve performance of the communication network. For example, by providing GR matrix parameterization pre-processing for channel state information feedback enhancement in a communication network, it is possible to minimize signaling load and/or reduce bandwidth being dedicated to such signaling, machine learning model employment, encoding/decoding of channel measurements, and/or other such activities.

As illustrated in FIG. 1, a communication system 100 is provided in accordance with various example embodiments of the subject disclosure. In one or more example embodiments, the communication system 100 can include one or more terminal devices (e.g., user equipment) and one or more networks (e.g., one or more communication networks). In various example embodiments, the communication system 100 is an environment (e.g., a communication network) that includes or corresponds to a 5G communication system (e.g., a 5G communication network) associated with one or more terminal devices (e.g., user equipment) and/or one or more networks (e.g., one or more communication networks) that support 5G communications. However, the depiction of communication system 100 in FIG. 1 is not intended to limit or otherwise confine the example embodiments described and contemplated herein to any particular configuration of elements or networks, nor is it intended to exclude any alternative configurations or systems for the set of configurations and systems that can be used in connection with embodiments of the subject disclosure. Rather, FIG. 1, and the communication system 100 disclosed therein is merely presented to provide an example basis and context for the facilitation of describing some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components In some example embodiments, the communication system 100 may comprise at least one user equipment (UE) 110 and at least one network component 111 that are capable of being in communication with each other and to receive uplink (UL) and/or downlink (DL) transmissions. The at least one network component 111 can be a network device. In various embodiments, the at least one network component 111 can be a radio access network (RAN) component, a core network (CN) component, a data network (DN) component, an application server component, an application function, and/or another type of network component. In one or more example embodiments, the at least one network component 111, may be a network element and may be embodied by any of a variety of access points including, for example, a Node B, e.g., a gNB, or the like. The UEs 110 may be configured to operate in two or more frequency bands, such as three or four frequency bands in some example embodiments. With respect to at least some, but not necessarily all, of the frequency bands, the UE 110 and/or the at least one network component 111 may be configured to provide GR matrix parameterization pre-processing for channel state information feedback enhancement related to encoding and/or decoding of channel measurements.

As described below, the apparatus, method and computer program product of an example embodiment are configured to implement GR matrix parameterization pre-processing to reduce bandwidth of data transmitted via the communication system 100, remove unneeded bits for transmissions related to the communication system 100, and/or mitigate packet fragmentation during transmission of data via the communication system 100.

By way of example, the communication system 100 may be deployed within a radio access architecture based on long term evolution advanced (LTE Advanced, LTE-A) and/or new radio (NR, 5G). However, the system may be deployed in other network architectures including within other communication networks including, for example, other communication networks developed in the future, e.g., 6G networks, as well as any of a number of existing networks including a universal mobile telecommunication system (UMTS), radio access network (UTRAN or E-UTRAN), wireless local area network (WLAN or Wi-Fi), worldwide interoperability for microwave access (WiMAX), Bluetooth®, personal communications services (PCS), Zig-Bee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The UE 110 may be any type of user terminal, terminal device, etc. to which resources on the air interface are allocated and assigned. For example, the UEs may be a portable computing device such as a wireless mobile communication device including, but not limited to, the following types of devices: a mobile station (mobile phone), smartphone, a virtual reality device, an augmented reality device, personal digital assistant (PDA), handset, device using a wireless modem (alarm or measurement device, etc.), laptop and/or touch screen computer, tablet, game console, notebook, and multimedia device. The user equipment may also be called a subscriber unit, mobile station, remote terminal, access terminal, or user terminal just to mention but a few names or apparatuses.

In some example embodiments, the at least one network component 111 can be related to one or more cellular access points. In some example embodiments, the at least one network component 111 may define and/or service one or more cells. In one or more example embodiments, one or more access points may be in communication with a network, such as a core network via a gateway, such that the one or more access points establish cellular radio access networks by which the UE 102 may communicate with the at least one network component 111.

Although not shown, the communication system 100 may also include a controller associated with one or more of the access points, such as, base stations, for example, so as to facilitate operation of the access points and management of the UE 102 in communication therewith. As shown in FIG. 1, the communication system 100 may also include one or more wireless local area networks (WLANs), each of which may be serviced by a WLAN access point configured to establish wireless communications with the UE 102. As such, the UE 102 may communicate with the at least one network component 111 via a WLAN access point. In various example embodiments, the at least one network component 111 may consist of additional network elements as routers, switches, servers, gateways, and/or controllers to facilitate communication with the UE 102.

In some example embodiments, the communication system 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some example embodiments, the communication system 100 can comprise or employ massive Multiple Input and Multiple Output (massive MIMO) antennas. In some example embodiments, the communication system 100 can comprise multi-user MIMO (MU-MIMO) antennas. In some example embodiments, the communication system 100 can employ edge computing whereby the computing servers are communicatively, physically, computationally, and/or temporally closer to the communications device (e.g., UE 102) in order to reduce latency and data traffic congestion. In some example embodiments, the communication system 100 can employ other technologies, devices, or techniques, such as small cell, low-powered RAN, beamforming of radio waves, WIFI-cellular convergence, Non-Orthogonal Multiple Access (NOMA), channel coding, and the like.

Referring now to FIG. 2, an example apparatus 200 is provided. The apparatus 200 may be an embodiment of a UE 110, a RAN 120, an application function (AF) 130, a user plane function (UPF) 140, a policy control function (PCF) 150A, and/or a session management function (SMF) 150B as illustrated in FIG. 3. In one or more example embodiments, the AF 130, the UPF 140, and/or the PCF 150A may be integrated within a core network in communication with or otherwise associated with a UE 110. Alternatively, the apparatus 200 may be an embodiment of another type of network element or may be embodied by or otherwise associated with another type of network element such as, for example, an access point.

The apparatus 200 includes processor 202, memory 204, and/or network interface 206. The apparatus 200 may be configured to execute one or more of the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some example embodiments, the processor 202 (and/or co-processor or any other processing circuitry assisting or otherwise associated with the processor) may be in communication with the memory 204 via a bus for passing information among components of the apparatus 200. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with an example embodiment disclosed herein.

The processor 202 may be embodied in a number of different ways and may, for example, include one or more processing devices configured to perform independently. In some non-limiting embodiments, the processor 202 may include one or more processors configured in tandem via a bus to enable independent execution of instructions, pipelining, and/or multithreading. The use of the term "processor" may be understood to include a single core processor, a multi-core processor, multiple processors internal to the apparatus 200, and/or remote or "cloud" processors.

In some example embodiments, the processor 202 may be configured to execute instructions stored in the memory 204 and/or circuitry otherwise accessible to the processor 202. In some example embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some example embodiments, the apparatus 200 may optionally include input/output circuitry that may, in turn, be in communication with processor 202 to provide output to a user and/or other entity and, in some example embodiments, to receive an indication of an input. The input/output circuitry may comprise a user interface and may include a display, and may comprise a web user interface, a mobile application, a query-initiating computing device, a kiosk, or the like. In some example embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The network interface 206 may be any means such as a device or circuitry embodied in either hardware or a combination of hardware and software that is configured to receive and/or transmit data from/to a network, e.g., one or more of the RAN 120 and/or any other device, circuitry, or module in communication with the apparatus 200. In this regard, the network interface 206 may include, for example, a network interface for enabling communications with a wired or wireless communication network. For example, the network interface 206 may include one or more network interface cards, antennae, buses, switches, routers, modems, and supporting hardware and/or software, or any other device suitable for enabling communications via a network. Additionally, or alternatively, the network interface 206 may include the circuitry for interacting with the antenna/antennae to cause transmission of signals via the antenna/antennae or to handle receipt of signals received via the antenna/antennae.

It should be appreciated that the embodiments described herein are not restricted to the system that is given as an example, such as a 5G system, and that a person skilled in the art may apply the solution to other communication systems including 6G or other communication systems being developed or to be developed in the future. Additionally, although some embodiments described herein in the context of a base station, the method may be performed by other types of network entities in accordance with other example embodiments FIG. 3 illustrates an example architecture that provides GR matrix parameterization pre-processing for channel state information feedback enhancement in accordance with an example embodiment of the subject disclosure. As shown, the architecture may comprise the UE 110, the RAN 120, the AF 130, the UPF 140, the PCF 150A, and/or the SMF 150B.

In one or more example embodiments, the UE 102 is in operable communication with the RAN 120, such as by way of a transmission tower, a base station, an access point, a network node, and/or the like. In some example embodiments, the RAN 120 can communicate with the UPF 140, the SMF 150B, or a component or entity thereof. In some example embodiments, the AF 130, the UPF 140, the PCF 150A, and/or the SMF 150B can be included in a core network that facilitates communication with the UE 102, such as for sending data, messages, requests, and/or the like. In some example embodiments, the UE 102 can connect to the RAN 120, which can then relay the communications between the UE 102 and one or more portions of the core network such as, for example, the AF 130, the UPF 140, the PCF 150A, and/or the SMF 150B. In other example embodiments, the core network may further include a network exposure function (NEF) and/or one or more additional network functions (e.g., Network Slice Selection Function (NSSF), Unified Data Repository (UDR), etc.) that may assist in communication between an application and a user equipment. For instance, in some example embodiments, the core network may additionally or alternatively include one or more of the following network functions: NEF, NSSF, UDR, Authentication Server Function (AUSF), Access and Mobility Management Function (AMF), Data Network (DN), e.g. operator services, Internet access or 3rd party services, Unstructured Data Storage Function (UDSF), Network Repository Function (NRF), Unified Data Management (UDM), User Plane Function (UPF), UE radio Capability Management Function (UCMF), Network Data Analytics Function (NWDAF), and/or Charging Function (CHF). The system environment may further comprise the following network entities: Service Communication Proxy (SCP) and Security Edge Protection Proxy (SEPP). In some example embodiments, the SMF 150B can be in direct communication with the UPF 140.

In some example embodiments, the UE 102 can comprise a single-mode or a dual-mode device such that the UE 102 can be connected to the RAN 120. In some example embodiments, the RAN 120 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the core network. In some example embodiments, the RAN 120 can comprise or be implemented using a chip, such as a silicon chip, in the UE 102 that can be paired with or otherwise recognized by a similar chip in the core network, such that the RAN 120 can establish a connection or line of communication between the UE 102 and the core network by identifying and pairing the chip within the UE 102 with the chip within the core network. In some example embodiments, the RAN 120 can implement one or more base stations, towers or the like to communicate between the UE 102 and the AF 130, the UPF 140, the PCF 150A, and/or the SMF 150B of the core network.

In some example embodiments, the UE 102 can be configured to communicate with the RAN 120 in a N1 interface, e.g., according to a non-access stratum (NAS) protocol. In some example embodiments, RAN 120 can be configured to communicate with the AF 130, the PCF 150A, and/or the SMF 150B of the core network in a N2 interface (e.g., in a control plane between a base station of the RAN 120 and the AF 130, the PCF 150A, and/or the SMF 150B of the core network). In some example embodiments, the RAN 120 can be configured to communicate with the UPF 140 in a N3 interface, e.g., in a user plane. In some example embodiments, the AF 130, the UPF 140, the PCF 150A, and/or the SMF 150B of the core network can be configured to communicate with other services or network entities within the core network in various different interfaces and/or according to various different protocols. In one or more example embodiments, the SMF 150B can be configured to communicate with the UPF 140 in a N4 interface, which can act as a bridge between the control plane and the user plane, such as acting as a conduit for a packet data unit (PDU) session during which one or more PDUs and/or one or more PDU sets are transmitted between the UE 102, the RAN 120, the AF 130, the UPF 140, the PCF 150A, the SMF 150B, and/or or components/services thereof. With further reference to FIG. 3, in various example embodiments, the PCF 150A may authorize the request received from the application function (AF) 130. In an instance in which the PCF authorizes the request from the AF, the PCF 150A may incorporate the information received from the AF 130 into a policy and charging control (PCC) rule. In one or more example embodiments, the PCF 150A transmits the PCC rule to the session management function (SMF) 150B. With even further reference to FIG. 3, in various example embodiments, the PDU session anchor (PSA) user plane function (UPF) 140 is configured to support detection of PDU sets and/or marking of PDU sets by transmitting one or more general packet radio service (GPRS) tunnelling protocol-user plane (GTP-U) packets (e.g., header extension) to the RAN 120.

It will be appreciated that certain example embodiments described herein arise in the context of a telecommunications network, including but not limited to a telecommunications network that conforms to and/or otherwise incorporates aspects of a 5G architecture. While FIGS. 1-3 illustrate various configurations and/or components of an example architecture of a communications network, many other systems, system configurations, networks, network entities, and pathways/protocols for communication therein are contemplated and considered within the scope of this subject disclosure.

While the methods, devices/apparatuses, and computer program products/codes described herein are described within the context of a 5th generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the subject disclosure.

FIG. 4 illustrates a communication system 400 in accordance with various example embodiments of the subject disclosure. The communication system 400 can be an embodiment of the communication system 100. In this regard, the communication system 400 includes the UE 110 and the at least one network component 111. To provide GR matrix parameterization pre-processing for channel state information feedback enhancement, the UE 110 includes integrated pre-processing 402 for an AI encoder 404. The integrated pre-processing 402 can be configured for GR matrix parameterization (e.g., matrix parameterization via GR) associated with channel measurement data 401. For example, the channel measurement data 401 can include one or more channel measurements related to the UE 110. In one or more embodiments, the channel measurement data 401 can include one or more downlink channel measurements related to the UE 110. For example, the channel measurement data 401 can include one or more downlink signals received from the at least one network component 111 or another network component (e.g., a cell tower). The one or more downlink signals can be received via a communication channel associated with a particular frequency. In some embodiments, the channel measurement data 401 can be related to one or more radio channel states. The integrated pre-processing 402 can additionally or alternatively be configured for singular value decomposition related to the channel measurement data 401. For example, the singular value decomposition can provide a factorization of the channel measurement data 401 to facilitate the GR matrix parameterization and/or further processing via the AI encoder 404.

In one or more embodiments, the integrated pre-processing 402 includes pre-processing 406. The pre-processing 406 can be configured for the singular value decomposition, a digital transformation (e.g., a discrete Fourier transform), and/or other pre-processing of the channel measurement data 401 to facilitate GR matrix parameterization 408. In one or more embodiments, the pre-processing 406 can transform the channel measurement data 401 into a matrix (e.g., a channel measurement matrix). In one or more embodiments, the pre-processing 406 can determine one or more CSI reference signal (CSI-RS) associated with the channel measurement data 401. Additionally, the pre-processing 406 can determine one or more channel eigenvectors associated with the channel measurement data 401. For example, the pre-processing 406 can determine respective channel eigenvectors for channel estimates associated with the channel measurement data 401. In one or more embodiments, the pre-processing 406 can decompose a channel matrix $H \epsilon C^{r \times t}$ associated with the channel measurement data 401 via singular value decomposition, where r is the number of antennae at a receiver of the UE 110 and t is the number of antennae at a transmitter of the at least one network component 111. The decomposed channel matrix can correspond to $H = U \Sigma V^{H}$, where $U \epsilon C^{r \times n}$, $V \epsilon C^{t \times n}$ and $\Sigma \epsilon R^{n \times n}$, and n corresponds to the rank of the channel. The matrix $V \epsilon C^{t \times n}$ can correspond to spatial information to be utilized at the at least one network component 111. For example, the matrix V can be utilized as a precoding matrix to enforce parallel decomposition of MIMO channels.

The GR matrix parameterization 408 can be configured for matrix parameterization and/or matrix decomposition via GR. In one or more embodiments, the GR matrix parameterization 408 can transform the channel measurement data 401 and/or a pre-processed version of the channel measurement data 401 as provided by the pre-processing 406 into GR matrix parameter data 409. In one or more embodiments, the GR matrix parameter data 409 is associated with respective channel eigenvectors and/or channel eigenvector matrix data for the channel measurement data 401. In one or more embodiments, the GR matrix parameter data 409 includes phase data and/or rotational angle data associated with the channel measurement data 401. For example, the GR matrix parameterization 408 can utilize a Givens rotation-based scheme to extract a set of parameters that comprise a one-to-one mapping to the matrix V (e.g., the channel measurement matrix) provided by the pre-processing 406. The number of the resulting Givens parameters provided by the GR matrix parameterization 408 can be equal to a degree of freedom of the channel spatial information associated with the channel measurement data 401. In an example, the GR matrix parameterization 408 can decompose a matrix $V \epsilon C^{t \times n}$ (t≥n) with orthonormal columns as $$V = \left[ \prod_{k=1}^{n} D_k(\phi_{k,k}, \ldots, \phi_{k,t}) \prod_{l=1}^{t-k} G_{t-l,t-l+1}(\theta_{k,l}) \right] \tilde{I},$$

where a diagonal matrix of size t by t $D_k(\phi_{k,k}, \ldots, \phi_{k,t})$=diag($1_{k-1}, e^{j\phi_{k,k}}, \ldots, e^{j\phi_{k,t}}$) $1_{k-1}$ is (k–1) 1's and $G_{p-1,p}(\theta)$ is the Givens matrix which operates in the (p–1, p) coordinate plane.

In one or more embodiments, the GR matrix parameter data 409 can include a set of parameters associated with the channel measurement data 401. The set of parameters can be a set of GR parameters that are pre-processed for the AI encoder 404. For example, the set of parameters can include one or more phase parameters (e.g., $\phi$) and/or one or more rotational angle parameters (e.g., $\theta$) associated with the channel measurement data 401. As such, the original ortho-normal column matrix associated with the channel measurement data 401 can be exactly reconstructed without any loss by using smaller number of real value parameters. In one or more embodiments, the GR matrix parameterization 408 can perform GR parameterization-based pre-processing (e.g., GR-based matrix parameterization and/or decomposition) with respect to a channel eigenvector matrix provided by the pre-processing 406. In an embodiment, the GR matrix parameterization 408 can perform GR parameterization-based pre-processing with respect to a channel eigenvector matrix provided by the pre-processing 406 as a whole ($\hat{V}$) or with respect to individual channel eigenvectors ($\hat{v}_i$). As such, singular value decomposition and GR-based parameterization can be integrated together such that overall computational complexity for the AI encoder 404. Additionally, orthogonality of channel eigenvectors can be maintained via the GR matrix parameterization 408 at the UE 110 and a counter-part operation at the at least one network component 111.

In one or more embodiments, the AI encoder 404 includes at least one AI model 410. The at least one AI model 410 can encode the GR matrix parameter data 409 to generate CSI feedback data 411 associated with the channel measurement data 401. In one or more embodiments, the at least one AI model 410 can encode respective channel layers associated with the GR matrix parameter data 409 to generate at least a portion of the CSI feedback data 411. In one or more embodiments, the at least one AI model 410 can include an AI model (e.g., a phase compression AI model) configured for phase compression to generate at least a portion of the CSI feedback data 411. Additionally or alternatively, the at least one AI model 410 can include an AI model (e.g., rotational angle compression AI model) configured for rotational angle compression to generate at least a portion of the CSI feedback data 411. The CSI feedback data 411 can include one or more CSI parameters to be utilized by the at least one network component 111. For example, the CSI feedback data 411 can include one or more channel quality indicator (CQI) parameters, one or more rank indicator (RI) parameters, one or more precoding matrix indicator (PMI) parameters, one or more CSI resource indicator (CRI) parameters, one or more SS/PBCH resource block indicator (SSBRI) parameters, one or more layer indicator (LI) parameters, and/or one or more other types of CSI parameters related to the channel measurement data 401.

In one or more embodiments, the at least one AI model 410 can encode the GR matrix parameter data 409 to generate codeword data 413 associated with the channel measurement data 401. The codeword data 413 can be a latent vector per respective eigenvectors associated with CSI information such as, for example, CSI parameters. Additionally, in one or more embodiments, the UE 110 includes a quantizer 412 that quantizes the codeword data 413 to generate the CSI feedback data 411. In one or more embodiments, the UE 110 causes transmission of the CSI feedback data 411 to the at least one network component 111. Additionally, in certain embodiments, the UE 110 causes transmission of a pairing identifier to the at least one network component 111. The pairing identifier can indicate a type of matrix parameterization processing scheme associated with the GR matrix parameter data 409. In some embodiments, the CSI feedback data 411 can include the pairing identifier. In other embodiments, the pairing identifier can be transmitted separate from the CSI feedback data 411 via a CSI report. In some embodiments, the UE 110 can encode at least a portion of the GR matrix parameter data 409 without utilization of the at least one AI model 410 to generate encoded GR matrix parameter data. Additionally, the UE 110 can cause transmission of the encoded GR matrix parameter data via ground-truth CSI reporting. In some embodiments, the ground-truth CSI reporting can include the encoded GR matrix parameter data, the pairing identifier, a respective model identifier for the at least one AI model 410, and/or other CSI reporting information.

In one or more embodiments, the at least one network component 111 receives the CSI feedback data 411 from the UE 110. In one or more embodiments, the at least one network component 111 includes an AI decoder 454. The AI decoder 454 includes at least one AI model 450 that decodes the CSI feedback data 411 to generate GR matrix parameter data 459 associated with the CSI feedback data 411. The GR matrix parameter data 459 can be a decoded version of the GR matrix parameter data 409 determined by the UE 110. For example, the GR matrix parameter data 459 can be associated with respective channel eigenvectors and/or channel eigenvector matrix data for the channel measurement data 401. In one or more embodiments, the GR matrix parameter data 459 includes phase data and/or rotational angle data associated with the channel measurement data 401. For example, the at least one AI model 450 can determine phase data and/or rotational angle data associated with the CSI feedback data 411. In certain embodiments, the at least one network component 111 includes dequantizer 452 that dequantizes the CSI feedback data 411 to determine codeword data 453. The codeword data 453 can correspond to the codeword data 413 after the dequantizing via the dequantizer 452. Additionally, the at least one AI model 450 can decode the codeword data 453 to generate the GR matrix parameter data 459. In one or more embodiments, the at least one network component 111 includes GR matrix composition 458 and/or post-processing 456 to transform the GR matrix parameter data 459 into CSI 461 for the UE 110. For example, the CSI 461 can include channel state information related to the channel measurement data 401. In certain embodiments, the at least one network component 111 can receive the pairing identifier from the UE 110. Additionally, the GR matrix composition 458 and/or the post-processing 456 can transform the GR matrix parameter data 459 into the CSI 461 based on the pairing identifier. In certain embodiments, the at least one network component 111 can determine CSI reporting data associated with the CSI feedback data 411 without utilization of the at least one AI model 450. In certain embodiments, the at least one network component 111 can decode encoded GR matrix parameter data received from the UE 110 without utilization of the at least one AI model 450 to facilitate decoding of the CSI feedback data 411.

FIG. 5 illustrates example GR matrix parameter data 409 in accordance with various example embodiments of the subject disclosure. As illustrated in FIG. 5, a number of GR matrix parameters decreases over increasing rank/layer indexes. As such, for the same compression ratio (CR), a size of output of AI encoder 404 can be decreased over increasing rank/layer index. For example, by utilizing the GR matrix parameterization 408, the number of real value parameters for $V \epsilon \mathbb{C}^{t \times n}$ can be reduced from (2tn) to (2t−1)n−n².

As illustrated in FIG. 5 with different input spaces (t, n)∈{(16,4), (32,4), (32,8)}, model scalability for the at least one AI model 410 over various possible transmitter/receiver antennae combinations can be reduced by optimizing the overall input parameter space. In various embodiments, remaining parts of GR parameter-space can be configured as a zero, zero-padding values, "not a number" (NaN) values, or any other out-of-range number prior to being input into the at least one AI model 410. Hence a compact size latent vector for the CSI feedback data 411 can be realized to provide more efficient CSI feedback signaling between the UE 110 and the at least one network component 111.

FIG. 6 illustrates GR-based parameter encoding 600 in accordance with various example embodiments of the subject disclosure. The GR-based parameter encoding 600 can be an encoding processed performed by the AI encoder 404 (e.g., by the at least one AI model 410). In one or more embodiments, the GR-based parameter encoding 600 includes channel estimation 602 with respect to the channel measurement data 401. The GR-based parameter encoding 600 additionally or alternatively includes singular value decomposition (SVD) 604 per sub-band of the channel measurement data 401 to provide a Givens rotation 606. The Givens rotation 606 can provide one or more Givens rotation parameters such as Givens parameters related to phase data and/or rotational angle data for the channel measurement data 401. For example, the Givens rotation 606 can provide the GR matrix parameter data 409. In certain embodiments, the GR-based parameter encoding 600 additionally or alternatively includes parameter ordering/grouping 608 with respect to the Givens rotation 606. The GR matrix parameter data 409 associated with the Givens rotation 606 can be provided as input to the AI encoder 404. In an embodiment, the AI encoder 404 can encode the GR matrix parameter data 409 on a per matrix basis. Alternatively, the AI encoder 404 can encode the GR matrix parameter data 409 on a per layer (e.g., per rank) basis. For example, in certain embodiments, the GR-based parameter encoding 600 additionally or alternatively includes per-layer processing 610 to configure the Givens rotation 606 for per layer encoding via the AI encoder 404.

FIG. 7 illustrates an example AI encoder 700 in accordance with various example embodiments of the subject disclosure. The AI encoder 700 can correspond to an embodiment of the AI encoder 404 for encoding the GR matrix parameter data 409 on a per matrix basis. The AI encoder 700 and/or one or more AI models of the AI encoder 700 can be configured as a neural network, a convolutional neural network (CNN), a fully connected layer model, or another type of AI model with progressively compact dedicated trained parameter sets per layer index k.

FIG. 8 illustrates an example AI encoder 800 in accordance with various example embodiments of the subject disclosure. The AI encoder 800 can correspond to an embodiment of the AI encoder 404 for encoding the GR matrix parameter data 409 on a per layer basis. The AI encoder 800 and/or one or more AI models of the AI encoder

800 can be configured as a neural network, a CNN, a fully connected layer model, or another type of AI model with dedicated trained parameter sets per layer index i associated with an approximately corresponding size across layer index i.

FIG. 9 illustrates example transmissions between the UE 110 and the at least one network component 111, according to one or more embodiments. For example, the at least one network component 111 can correspond to the RAN 120, the AF 130, the UPF 140, the PCF 150A, and/or the SMF 150B, according to one or more embodiments. The below example transmissions provide the foreseen functions or messaging needed.

In one or more embodiments, the UE 110 can transmit UE capabilities to the at least one network component 111, at step 1. The UE capabilities can include signaling of UE capabilities with respect to AI-based CSI reporting. In one or more embodiments, the UE capabilities can include one or more AI model identifiers for one or more AI models supported by the UE 110 for encoding, one or more pairing identifiers related to a supported pre-processing scheme for GR parameterization, and/or other data related to UE capabilities.

In one or more embodiments, the at least one network component 111 can transmit a higher-level configuration to the UE 110, at step 2. The higher-level configuration can include signaling of a configuration of confirmed supported AI-based CSI reporting.

In one or more embodiments, the at least one network component 111 can transmit a lower-level trigger of a CSI report to the UE 110, at step 3. The lower-level trigger can include signaling of a medium access control (MAC) control element (MAC CE), downlink control information (DCI), and/or other control information.

In one or more embodiments, the at least one network component 111 can transmit CSI-related reference signal (CSI-related RS) to the UE 110, at step 4. For example, the CSI-related RS can be utilized to measure characteristics of a radio channel for modulation, code rate determinations, beamforming, etc.

In one or more embodiments, the UE 110 can prepare CSI feedback, at step 5. For example, the UE 110 can determine CSI measurements, channel parameter/matrix estimation, pre-processing related to singular value decomposition and/or GR decomposition, AI encoding, etc. as more fully disclosed herein.

In one or more embodiments, the UE 110 can transmit a CSI report to the at least one network component 111, at step 6. In one or more embodiments, the CSI report can include the CSI feedback data 411 and/or other data associated with CSI reporting.

In one or more embodiments, the at least one network component 111 can perform decoding of the CSI report, at step 7.

FIG. 10 illustrates a flowchart depicting a method 1000 according to an example embodiment of the present disclosure. The operations of the method 1000 are performed, such as by the apparatus 200 of FIG. 2, in order to provide for GR matrix parameterization pre-processing for channel state information feedback enhancement in a communication network, in accordance with one or more embodiments of the present disclosure. The apparatus 200 can be implemented, for example, by the UE 110. As shown in block 1002 of FIG. 10, the apparatus 200 includes means, such as the processor 202, the network interface 206, or the like, configured to transform channel measurement data related to a user equipment into Givens rotation (GR) matrix parameter data. In one or more embodiments, the GR matrix parameter data is associated with respective channel eigenvectors for the channel measurement data. In one or more embodiments, the GR matrix parameter data is associated with channel eigenvector matrix data for the channel measurement data. In one or more embodiments, the GR matrix parameter data includes phase data associated with the channel measurement data and/or rotational angle data associated with the channel measurement data. As shown in block 1004 of FIG. 10, the apparatus 200 additionally or alternatively includes means, such as the processor 202, the network interface 206, or the like, configured to encode the GR matrix parameter data using at least one artificial intelligence (AI) model to generate channel state information (CSI) feedback data associated with the channel measurement data. In one or more embodiments, the apparatus 200 additionally or alternatively includes means, such as the processor 202, the network interface 206, or the like, configured to encode respective channel layers associated with the GR matrix parameter data to generate at least a portion of the CSI feedback data. In one or more embodiments, the apparatus 200 additionally or alternatively includes means, such as the processor 202, the network interface 206, or the like, configured to encode the GR matrix parameter data using an AI model configured for phase compression to generate at least a portion of the CSI feedback data. In one or more embodiments, the apparatus 200 additionally or alternatively includes means, such as the processor 202, the network interface 206, or the like, configured to encode the GR matrix parameter data using an AI model configured for rotational angle compression to generate at least a portion of the CSI feedback data. As shown in block 1006 of FIG. 10, the apparatus 200 additionally or alternatively includes means, such as the processor 202, the network interface 206, or the like, configured to cause transmission of the CSI feedback data to a network device.

In one or more embodiments, the apparatus 200 additionally or alternatively includes means, such as the processor 202, the network interface 206, or the like, configured to encode the GR matrix parameter data using the at least one AI model to generate codeword data associated with the channel measurement data. In one or more embodiments, the apparatus 200 additionally or alternatively includes means, such as the processor 202, the network interface 206, or the like, configured to quantize the codeword data to generate the CSI feedback data.

In one or more embodiments, the apparatus 200 additionally or alternatively includes means, such as the processor 202, the network interface 206, or the like, configured to cause transmission of a pairing identifier to the network device, wherein the pairing identifier indicates a type of matrix parameterization processing scheme associated with the GR matrix parameter data.

In one or more embodiments, the apparatus 200 additionally or alternatively includes means, such as the processor 202, the network interface 206, or the like, configured to encode at least a portion of the GR matrix parameter data without utilization of the at least one AI model to generate encoded GR matrix parameter data. In one or more embodiments, the apparatus 200 additionally or alternatively includes means, such as the processor 202, the network interface 206, or the like, configured to cause transmission of the encoded GR matrix parameter data via ground-truth CSI reporting.

FIG. 11 illustrates a flowchart depicting a method 1100 according to an example embodiment of the present disclosure. The operations of the method 1100 are performed, such as by the apparatus 200 of FIG. 2, in order to provide for GR matrix parameterization pre-processing for channel state information feedback enhancement in a communication network, in accordance with one or more embodiments of the present disclosure. The apparatus 200 can be implemented, for example, by the at least one network component 111. As shown in block 1102 of FIG. 11, the apparatus 200 includes means, such as the processor 202, the network interface 206, or the like, configured to receive channel state information (CSI) feedback data from a user equipment. As shown in block 1104 of FIG. 11, the apparatus 200 additionally or alternatively includes means, such as the processor 202, the network interface 206, or the like, configured to decode the CSI feedback data using at least one artificial intelligence (AI) model to generate Givens rotation (GR) matrix parameter data associated with the CSI feedback data. In one or more embodiments, the apparatus 200 additionally or alternatively includes means, such as the processor 202, the network interface 206, or the like, configured to determine phase data associated with the CSI feedback data and/or rotational angle data associated with the CSI feedback data. As shown in block 1106 of FIG. 11, the apparatus 200 additionally or alternatively includes means, such as the processor 202, the network interface 206, or the like, configured to transform the GR matrix parameter data into CSI for the user equipment.

In one or more embodiments, the apparatus 200 additionally or alternatively includes means, such as the processor 202, the network interface 206, or the like, configured to dequantize the CSI feedback data to determine codeword data. In one or more embodiments, the apparatus 200 additionally or alternatively includes means, such as the processor 202, the network interface 206, or the like, configured to decode the codeword data using the at least one AI model to generate the GR matrix parameter data.

In one or more embodiments, the apparatus 200 additionally or alternatively includes means, such as the processor 202, the network interface 206, or the like, configured to receive a pairing identifier from the user equipment, wherein the pairing identifier indicates a type of matrix parameterization processing scheme associated with the CSI feedback data. In one or more embodiments, the apparatus 200 additionally or alternatively includes means, such as the processor 202, the network interface 206, or the like, configured to transform the GR matrix parameter data into the CSI based on the pairing identifier.

In one or more embodiments, the apparatus 200 additionally or alternatively includes means, such as the processor 202, the network interface 206, or the like, configured to determine CSI reporting data associated with the CSI feedback data without utilization of the at least one AI model.

As described above, FIG. 10 is a flowchart of a method that can be carried out by, e.g., the apparatus 200, and/or according to a computer program product, according to example embodiments of the disclosure. Additionally, as described above, FIG. 11 is a flowchart of another method that can be carried out by, e.g., the apparatus 200, and/or according to a computer program product, according to example embodiments of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowchart of FIG. 9, as part of the communication system 100 of FIGS. 1-4, and/or in conjunction with the encoding processes, modeling, and/or parameterization illustrated in FIGS. 5-8. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 204 of the apparatus 200 employing an embodiment of the present disclosure and executed by the processor 202. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart(s).

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The expression "at least one of A or B" in this document means A, or B, or both A and B.

What is claimed is:

1. A method comprising:

transforming channel measurement data related to a user equipment into Givens rotation (GR) matrix parameter data, wherein the GR matrix parameter data comprises phase and rotational angle data associated with the channel measurement data;

encoding the GR matrix parameter data using at least one artificial intelligence (AI) model to generate channel state information (CSI) feedback data associated with the channel measurement data, wherein encoding the GR matrix parameter data comprises using a first AI model configured for phase compression to generate at least a first portion of the CSI feedback data, and a second AI model configured for rotational angle compression to generate at least a second portion of the CSI feedback data; and causing transmission of the CSI feedback data to a network device.

2. The method of claim 1, further comprising:

encoding the GR matrix parameter data using the at least one AI model to generate codeword data associated with the channel measurement data; and quantizing the codeword data to generate the CSI feedback data.

3. The method of claim 1, wherein the GR matrix parameter data is associated with respective channel eigenvectors for the channel measurement data.

4. The method of claim 1, wherein the GR matrix parameter data is associated with channel eigenvector matrix data for the channel measurement data.

5. The method of claim 1, wherein encoding the GR matrix parameter data comprises encoding respective channel layers associated with the GR matrix parameter data to generate at least a portion of the CSI feedback data.

6. The method of claim 1, further comprising:

causing transmission of a pairing identifier to the network device, wherein the pairing identifier indicates a type of matrix parameterization processing scheme associated with the GR matrix parameter data.

7. The method of claim 1, further comprising:

encoding at least a portion of the GR matrix parameter data without utilization of the at least one AI model to generate encoded GR matrix parameter data; and causing transmission of the encoded GR matrix parameter data via ground-truth CSI reporting.

8. An apparatus comprising:

at least one processor; and at least one memory storing instructions that, when executed by the at least one processor, cause the apparatus to:

transform channel measurement data related to a user equipment into Givens rotation (GR) matrix parameter data, wherein the GR matrix parameter data comprises phase and rotational angle data associated with the channel measurement;

encode the GR matrix parameter data using at least one artificial intelligence (AI) model to generate channel state information (CSI) feedback data associated with the channel measurement data, wherein the GR matrix parameter data is encoded using a first AI model configured for phase compression to generate at least a first portion of the CSI feedback data, and a second AI model configured for rotational angle compression to generate at least a second portion of the CSI feedback data; and cause transmission of the CSI feedback data to a network device.

9. The apparatus of claim 8, further comprising instructions that, when executed by the at least one processor, cause the apparatus to:

encode the GR matrix parameter data using the at least one AI model to generate codeword data associated with the channel measurement data; and quantize the codeword data to generate the CSI feedback data.

10. The apparatus of claim 8, further comprising instructions that, when executed by the at least one processor, cause the apparatus to:

cause transmission of a pairing identifier to the network device, wherein the pairing identifier indicates a type of matrix parameterization processing scheme associated with the GR matrix parameter data.

* * * * *